(12) United States Patent
Hoeschen

(10) Patent No.: US 8,944,316 B2
(45) Date of Patent: Feb. 3, 2015

(54) DEVICE FOR HANDLING CURRENCY NOTES AND METHOD FOR DEALING WITH A CURRENCY NOTE JAM

(75) Inventor: Hermann Hoeschen, Paderborn (DE)

(73) Assignee: Wincor Nixdorf International GmbH (DE)

( * ) Notice: Subject to any disclaimer, the term of this patent is extended or adjusted under 35 U.S.C. 154(b) by 222 days.

(21) Appl. No.: 13/606,367

(22) Filed: Sep. 7, 2012

(65) Prior Publication Data
US 2013/0245809 A1    Sep. 19, 2013

(30) Foreign Application Priority Data
Sep. 9, 2011   (DE) .................. 10 2011 053 441

(51) Int. Cl.
G06Q 40/00    (2012.01)
G06F 17/00    (2006.01)
G07F 19/00    (2006.01)
G07D 11/00    (2006.01)
G07F 9/06     (2006.01)

(52) U.S. Cl.
CPC ............. G06F 17/00 (2013.01); G07F 19/202 (2013.01); G07D 11/0054 (2013.01); G07D 11/0069 (2013.01); G07F 9/06 (2013.01)
USPC .......................................... 235/379; 235/380

(58) Field of Classification Search
CPC ... G07D 11/0084; G07D 7/12; G07D 7/0033; G07D 7/2025; G07D 11/0066; G07D 7/20; G07F 19/201; G07F 19/202; G07F 19/203; G07F 19/204; G07F 19/205; G07F 19/209

USPC ........................................ 235/379, 380, 383
See application file for complete search history.

(56) References Cited

U.S. PATENT DOCUMENTS

| | | | |
|---|---|---|---|
| 6,522,939 B1 * | 2/2003 | Strauch et al. | 700/116 |
| 6,782,987 B1 * | 8/2004 | Abe et al. | 194/207 |
| 6,938,892 B2 * | 9/2005 | Abe et al. | 271/109 |
| 8,689,700 B2 * | 4/2014 | Hoeschen | 104/206 |
| 2005/0023106 A1 * | 2/2005 | Abe et al. | 194/207 |
| 2005/0173515 A1 | 8/2005 | Sawa | |

FOREIGN PATENT DOCUMENTS

DE    39 09 637    10/1989
EP    2 154 655    2/2010

* cited by examiner

*Primary Examiner* — Thien M Le
(74) *Attorney, Agent, or Firm* — Harness, Dickey & Pierce, P.L.C.

(57) ABSTRACT

The invention relates to a device (10) for handling currency notes that comprises a deposit and dispensing unit (16), a controller (20), at least one currency box (22 to 28), a reject box (30) and a transport unit. When a currency note jam occurs during transportation of at least one deposited currency note from the deposit and dispensing unit (16) to the currency box (22 to 28), the value of a stock counter (52 to 58) is initially increased in a first step by the number of currency notes from the currency note jam, before the value of the stock counter (52 to 58) is reduced in a second step by the number of currency notes from the currency note jam, and the value of the reject counter (62 to 68) is incremented by the number of currency notes from the currency note jam.

14 Claims, 3 Drawing Sheets

FIG. 4

| | 5-Euro Currency Box | 10-Euro Currency Box | 20-Euro Currency Box | Additional Currency Box |
|---|---|---|---|---|
| Number Of Currency Notes In Currency Box | K | L | M | N |
| Number Of Currency Notes In Reject Box | 0 | 0 | 0 | 0 |

FIG. 5

| | 5-Euro Currency Box | 10-Euro Currency Box | 20-Euro Currency Box | Additional Currency Box |
|---|---|---|---|---|
| Number Of Currency Notes In Currency Box | K | L | M+1 | N |
| Number Of Currency Notes In Reject Box | 0 | 0 | 0 | 0 |

FIG. 6

| | 5-Euro Currency Box | 10-Euro Currency Box | 20-Euro Currency Box | Additional Currency Box |
|---|---|---|---|---|
| Number Of Currency Notes In Currency Box | K | L | M | N |
| Number Of Currency Notes In Reject Box | 0 | 0 | +1 | 0 |

DEVICE FOR HANDLING CURRENCY NOTES AND METHOD FOR DEALING WITH A CURRENCY NOTE JAM

BACKGROUND OF THE INVENTION

Discussion

The invention relates to a device for handling currency notes that comprises a deposit and dispensing unit, a controller, at least one currency box for storage, and a reject box for receiving currency notes to be retained. In addition, the device has a transport unit to transport the currency notes between the deposit and dispensing unit, the currency box and the reject box. The current stock of currency notes in the currency box is indicated with the aid of a stock counter, wherein, when a currency note is removed from the currency box, the controller reduces the value of the stock counter by the value of one and, with the addition of a currency note, increments said stock counter by the value of one. If an incorrect withdrawal occurs following the removal of at least one currency note from the currency box, the controller activates the transport unit in such a way that the latter transports the currency note, or currency notes, in the incorrect withdrawal to the reject box. Furthermore, a currency box-specific reject counter is provided that indicates the total number of currency notes removed from this currency box and taken to the reject box, wherein the controller increments the value of this reject counter by the number of currency notes transported to the reject box by reason of the incorrect withdrawal. The invention further relates to a method for operating a device for handling currency notes.

In the case of known devices for handling currency notes, a stock counter is provided for each currency box that indicates the current value of the currency box in currency notes, and a reject counter that indicates the number of currency notes removed from said currency box and taken to the reject box by reason of an incorrect withdrawal. The reject box itself does not have a stock counter, so that using the known devices and by reason of the software standards currently in use, the stock of the device is determined by totaling the stock counter and the reject counter of all the currency boxes. The stock of the reject box is known through the total of the reject counter.

In the case of the known devices and the known software applications, the reject box is provided solely for the purpose of accepting currency notes that cannot be dispensed by reason of an incorrect withdrawal at the time of disbursal. On the other hand, the software is not capable of posting currency notes to the reject box when a currency note jam occurs at the time notes are deposited. This leads to the problem that, when a currency note jam occurs when said notes are deposited in cash machines that do not possess a collective currency box in which denominations not intended for disbursal again are received, the currency notes from said jam can only be processed at the time of deposit in a complex manner in terms of data processing.

One common alternative is to transport the currency notes from the currency note jam into one of the currency boxes and subsequently to take said box out of operation, i.e. no additional currency notes can be deposited to or dispensed from said box. The disadvantage of this is that the number of usable currency boxes is reduced, and thus the function of the device is not available in its entirety and malfunctions may occur.

One additional alternative would be to transport the currency notes from the currency note jam to the reject box, but not to post the currency notes in terms of data processing. The disadvantage is that it is not possible, using the common applications stored in the controller, to determine the stock of current currency notes in the device.

The object of the invention is to cite a device for handling currency notes and a method for operating such a device, with the aid of which currency note jams occurring at the time of deposit can be handled in a simple manner.

Under an aspect of the invention, if a jam occurs during the transportation of at least one deposited currency note from the deposit and dispensing unit to the currency box, the controller initially increments the value of the stock counter of said currency box in a first step by the number of currency notes in the jam. In a subsequent second step, the controller reduces the value of the stock counter for said currency box by the number of currency notes from the jam and conversely increments the value of the reject counter by the number of currency notes from the jam.

The currency notes from the jam are preferably physically transported directly from the location where the currency note jam occurred into the reject box without being previously taken to the currency box.

The advantage of this process is that the currency notes from the jam are taken directly to the reject box so that the currency note jam is resolved in a simple fashion, but in terms of data processing in the first step is handled like a regular deposit of said currency notes into the currency box and a subsequent disbursal of said currency notes with an incorrect withdrawal that would result in the currency notes being transported to the reject box. In this way, the currency note jam occurring at the time of deposit can be posted through the known applications, in accordance with which transportation of currency notes to the reject box is provided for only at the time of disbursal, so that no costly modifications to the applications, in particular no modifications to the interfaces, are necessary.

An incorrect withdrawal at the time of disbursal is understood to mean in particular double withdrawals, multiple withdrawals and/or currency note jams when the currency notes that have been removed are dispensed. The currency notes of said double withdrawals, multiple withdrawals and/or currency note jams are then taken to the reject box by way of the transport unit to the reject box so that disbursal of a possibly incorrect amount of money is prevented.

The current value of the stock counter and/or the value of the reject counter for the currency box can be stored in a memory element of the currency box and/or in a memory element of the controller. The former has the advantage that the information about the currency box stock of currency notes remains in the currency box, and thus if the currency box is inserted into other devices for handling currency notes said devices can read the stock of the currency box. Storing the current values in the memory element of the controller, on the other hand, has the advantage that the values of all currency boxes contained in the device are stored centrally and can be managed in a simple fashion.

In a particularly preferred embodiment, several currency boxes are contained in the device, wherein the current value of a stock counter and the current value of a reject counter are stored by each currency box in a memory element. This has the advantage that the current stock of the device can be determined at any time.

Furthermore, it is advantageous, following the deposit of a bundle of currency notes by way of the deposit and dispensing unit, if the controller clearly assigns each currency note deposited to a currency box in which the currency note is to be accepted. In particular, a sensor is provided to determine the denomination of the currency notes deposited, wherein the controller assigns the currency notes to the individual currency boxes depending on the denomination that was determined. The controller activates the transport unit in such a manner that said transport unit transports each currency note to the currency box assigned to each currency note. If a currency note jam occurs during this transportation process, the controller activates the transport unit in such a manner that it transports the currency notes from the jam to the reject box. In addition, in a first step, the controller adds the currency notes involved in the jam to the value of the stock counter of the currency box to which the particular currency note is assigned. In the second step, the controller reduces the value of the stock counter of each currency box by the value by which it was incremented by reason of the currency note jam and increments the value of the reject counter of the respective currency box by this value. In this way, the end result is that through the occurrence of the currency note jam the currency notes are handled in terms of data processing as if they were initially deposited to the assigned currency boxes in a regular manner and were subsequently removed again for disbursal, where an incorrect withdrawal had occurred at this subsequent disbursal that would result in the currency notes being taken to the reject box.

It is further advantageous if the currency notes are stored in the currency boxes unmixed so that each requested denomination can be dispensed easily.

In order to determine the stock of currency notes for the device, the controller can total the values of the stock counters for all the currency boxes contained in the device and the values of the reject counters for all the currency boxes contained in the device so that the current stock can easily be determined. It is not necessary for this purpose for the reject box to have its own stock counter since the stock of the reject box is known from the reject counters of the currency boxes. In a particularly preferred embodiment the controller multiplies the value of the respective stock counter and the value of the reject counter by the denomination of the currency notes that have been accepted into the specific currency box and then totals the resulting values.

Program data for at least one application, preferably for several applications are stored in the controller. These applications are specifically configured as an Extension for Financial Services application or a Java Extension for Financial Services application. Extension for Financial Services and Java Extension for Financial Services are the two most common programming interfaces for controlling peripheral devices in self-service systems, in particular for cash machines, automated checkout systems and/or automated safes. Handling currency note jams occurring at the time of deposit in accordance with the invention means that the use of these widely used programming interfaces can continue unchanged, although said interfaces cannot actually process the occurrence of currency note jams at the time of deposit using data processing.

Specifically, a deposit application that the controller runs when currency notes are deposited, a dispensing application that the controller runs when currency notes are disbursed and/or a reject application that the controller runs when an incorrect withdrawal occurs, are stored in the processor. By running the deposit application, the stock counter for the currency box to which the deposited currency notes are taken, or the stock counters for the currency boxes to which the deposited currency notes are taken, is/are specifically incremented by the number of currency notes fed in. By running the dispensing application on the other hand, when currency notes are removed from a currency box, the value of the stock counter for that currency box is reduced by the number of currency notes removed. In the same way, by running the reject application when an incorrect withdrawal occurs after currency notes have been removed from a currency box, the reject counter for this currency box is incremented by the number of currency notes previously removed from this currency box and involved in the incorrect withdrawal.

It is advantageous if the controller runs the deposit application in a first step when a currency note jam occurs at the time said notes are deposited and, in a second step, the dispensing application and the reject application so that the stock counter can be incremented correspondingly in the first step, and the stock counter reduced and the reject counter incremented in the second step in a simple fashion using the applications that are already stored in the controller.

It is further advantageous when a currency note jam occurs at the time said notes are deposited, if the controller initially posts the currency notes in such a way as if no jam had occurred, i.e. as if the currency notes had been taken to their respectively assigned currency boxes. In the second step, the controller then posts a virtual disbursal of the notes in the currency notes jam, wherein the controller in turn posts the currency notes in this virtual disbursal in such a way as if a currency note jam had occurred during this virtual disbursal. The overall effect is that the currency notes in the jam occurring at the time of deposit are physically taken directly to the reject box, but in terms of data processing are posted initially like a regular deposit and a subsequent disbursal with an incorrect withdrawal.

A further aspect of the invention relates to a method for operating a device for handling currency notes, in which currency notes can be deposited and dispensed with the aid of a deposit and dispensing device. In addition, a currency box for storing currency notes, a reject box for receiving currency notes to be retained and a stock counter that indicates the current stock of currency notes in the currency box are employed. When a currency note is removed from the currency box, the value of the stock counter is reduced by the value 1 and incremented by the value 1 when a note is fed in. When an incorrect withdrawal occurs after at least one currency note is removed from the currency box, the currency note, or the currency notes, in the incorrect withdrawal is transported to the reject box. In addition, a reject counter is used, specific to and clearly assigned to the currency box, that indicates the total number of currency notes removed from this currency box and taken to the reject box. When an incorrect withdrawal occurs following removal of the at least one currency note from the currency box, the value of the reject counter is incremented by the number of currency notes transported to the reject box by reason of an incorrect withdrawal. When a currency note jam occurs during transportation of at least one deposited currency note from the deposit and dispensing unit to the currency box, the value of the stock counter for the currency box is initially incremented by the number of currency notes. Subsequently, in a second step, the value of the stock counter is reduced again by the number of currency notes in the jam, and the value of the reject counter for the currency box is incremented by the number of currency notes in the jam.

The method previously described can be developed further using the features described in connection with the device. In particular, the method can be developed further using the features cited in the dependent claims referring back to the independent claim for the device, or to the corresponding features of the method.

BRIEF DESCRIPTION OF THE DRAWINGS

Additional features and advantages of the device become evident from the following description that explains the invention in greater detail using embodiments in connection with the appended Figures.

FIG. 4 shows a schematic representation of the stock monitoring system of the device from FIG. 1 before a currency note jam occurs at the time of a deposit;

FIG. 5 shows a schematic representation of the stock monitoring system of the device from FIG. 1 after a currency note jam occurs at the time of a deposit and after running a first step of the method from FIG. 3; and FIG. 6 shows a schematic representation of the stock monitoring system for the device from FIG. 1 after the method from FIG. 3 has been run in its entirety.

DESCRIPTION OF THE PREFERRED EMBODIMENTS

Figure 1:
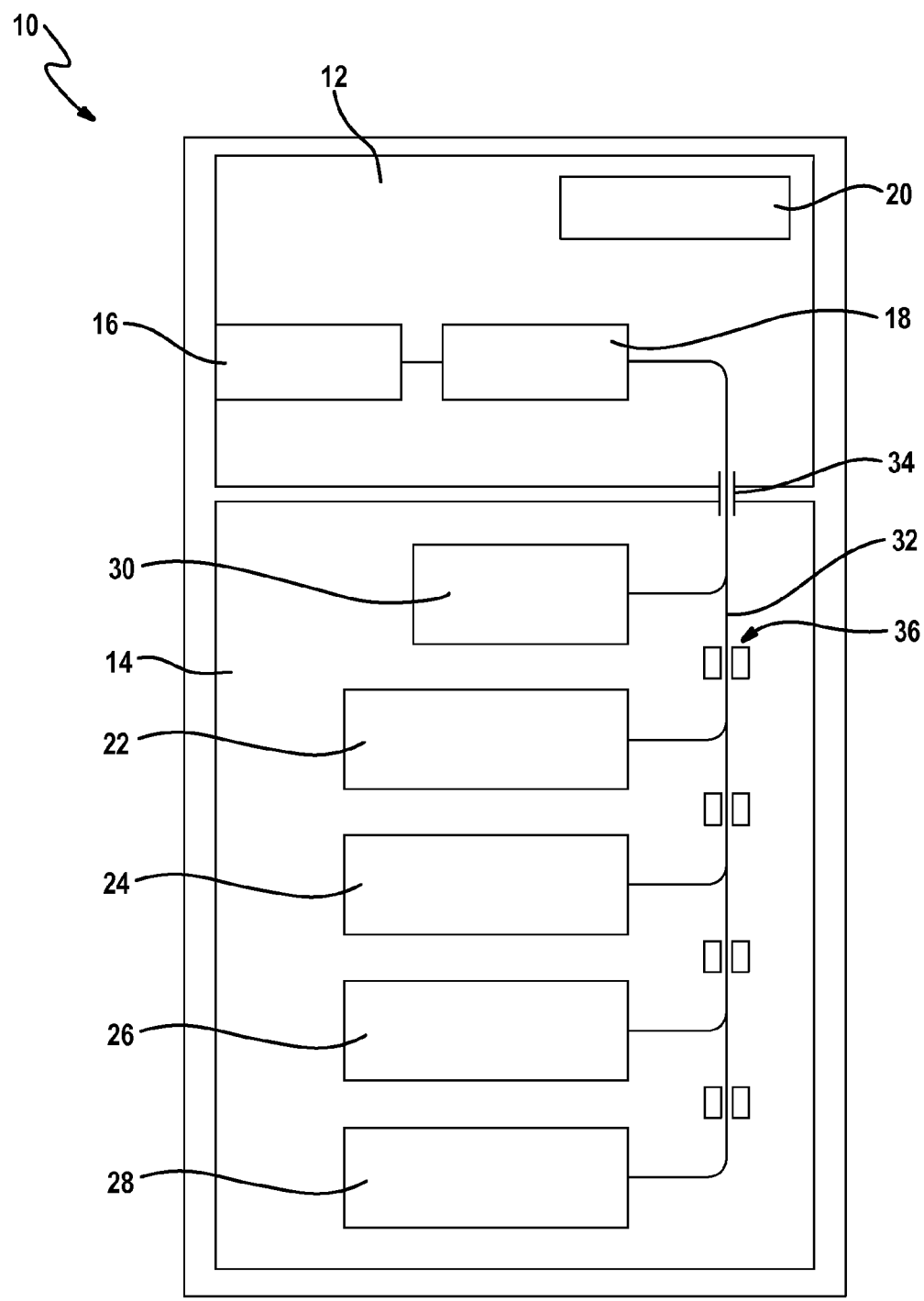
FIG. 1 shows a schematic representation of a device for handling currency notes.

FIG. 1 shows a schematic representation of a device configured as an automated checkout system for handling currency notes. Alternatively, the device 10 can also be a cash machine and/or an automated safe.

The device 10 comprises a header module 12 and a safe 14. A deposit and dispensing unit 16 is located in the header module 12, through which the currency notes can be deposited into the device 10 and currency notes can be dispensed from the device 10. In an alternative embodiment, two separate units can be provided, one of which is used solely to deposit currency notes and the other solely to dispense currency notes.

A sensor unit 18 and a controller 20 are additionally located in the header module. The sensor unit 18 can assist, for example, in determining the denomination of the currency notes deposited through the deposit and dispensing unit 16. In addition, the sensor unit 18 can assist in determining the authenticity of the currency notes that have been deposited.

Four currency boxes 22 to 28 and a reject box 30 are located in the safe 14. Currency notes that are intended for disbursal again are held in the respective currency boxes 22 to 28, whereas those currency notes that are not intended for disbursal again are held in the reject box. Specifically, the currency notes from a double or multiple withdrawal or from a currency note jam are held in the reject box 30. This ensures that the currency notes from one such double withdrawal, multiple withdrawal or currency note jam are not dispensed to a person operating the device 10, and thus ensures that the correct sum of money is dispensed to the person operating the device.

In an alternative embodiment of the invention, more than or fewer than four currency boxes 22 to 28 can be provided. Specifically, seven currency boxes 22 to 28 can be provided so that unmixed storage for all denominations of the Euro currency set is possible. If fewer than seven currency boxes 22 to 28 are provided, the currency notes are preferably stored unmixed in one part of these currency boxes 22 to 28, and in at least one of the currency boxes 22 to 28 the currency notes are stored in mixed storage. Unmixed storage is understood to mean that only currency notes of exactly one denomination are accepted in a currency box 22 to 28, whereas in mixed storage currency notes of at least two different denominations are accepted in one currency box 22 to 28. In the case of the embodiment shown in FIG. 1, 5-euro currency notes are stored unmixed in the first currency box, 10-euro notes unmixed in the second currency box and 20-euro notes unmixed in the third currency box. The currency notes can be transported between the deposit and dispensing unit 16 and the currency boxes 22 to 28 and the reject box 30 along a transport path 32 with the aid of a transport unit (not shown). A transfer slot 34 is specifically configured for this purpose, through which the currency notes can be transferred between the header module 12 and the safe 14.

Several sensors are specifically arranged along the transport path 32, one of which is identified as an example with the reference numeral 36. The occurrence of currency note jams in the transport path 32 can be identified with the aid of these sensors 36. The sensors 36 specifically include a light curtain. The sensors 36 can be thickness sensors, for example, with the aid of which the thickness of currency notes being transported past said sensors can be determined so that double withdrawals, multiple withdrawals, slips, and currency note jams can easily be detected. Currency note jams of this kind can arise both at the time of depositing currency notes are deposited and at the time currency notes are disbursed. When currency notes are disbursed, jams occur in particular when at least two currency notes are withdrawn simultaneously and unintentionally from one of the currency boxes 22 to 28, and consequently a double or multiple withdrawal occurs. The occurrence of a double withdrawal, multiple withdrawal and/or a currency note jam when disbursing currency notes is therefore designated as an incorrect withdrawal.

Figures 2, 3:
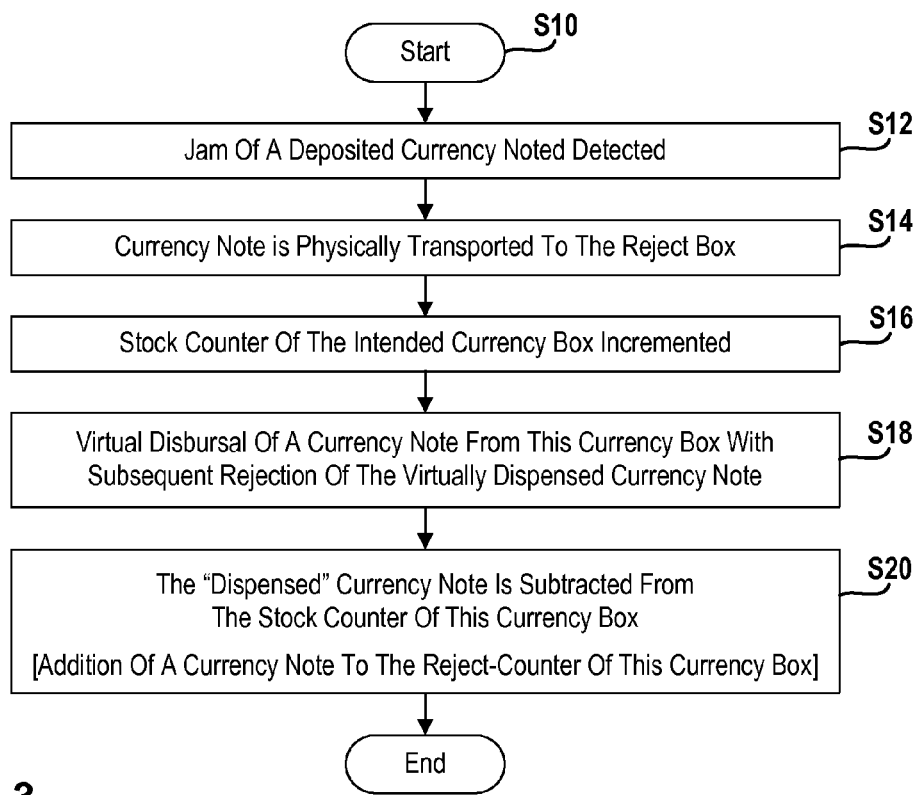
FIG. 2 shows a schematic representation of a stock monitoring system for the device from FIG. 1 for currency notes.
FIG. 3 shows a flow chart for a method for operating the device from FIG. 1.

FIG. 2 shows a schematic representation of the stock control system 50 of the device 10 from FIG. 1. A stock counter 52 to 58 and a reject counter 62 to 68 are clearly assigned to each currency box 22 to 28. The stock counters 52 to 58 indicate in each case the current stock of currency notes for the respective boxes 22 to 28. With a regular disbursal of notes the stock counters 52 to 58 are thus reduced in each case by the controller 20 by the number of notes removed at the time of disbursal from the corresponding currency box 22 to 28. Conversely, when notes are deposited, the value of the corresponding stock counters 52 to 58 is incremented in each case by the number of the notes fed into the specific currency box at this deposit.

If a currency note jam or a double or multiple withdrawal occurs during disbursal that is detected by the sensors, the notes in this incorrect withdrawal are transported to the reject box 30. In addition, the value of the reject counter 62 to 68 of the currency boxes 22 to 28 from which the currency notes in the currency note jam were taken is incremented by the number of currency notes removed from the respective currency box 22 to 28 and taken to the reject box 30. Thus, the respective reject counter 62 to 68 indicates the number of notes that were removed from the assigned currency box 22 to 28 and taken to the reject box 30 instead of to the deposit and dispensing unit 16.

By assigning a stock counter 52 to 58 and a reject counter 62 to 68 to each currency box 22 to 28, as described previously, the stock of the device 10 can be determined easily at any time by totaling the values of the stock counters 52 to 58 and of the reject counters 62 to 68. In particular, as part of this, the respective stock counter 52 to 58 and reject counter 62 to 68 can be multiplied by the denomination of the corresponding currency box 22 to 28 so that the value of the currency notes present in the device 10 can easily be determined.

The reject box 30 contains neither a stock counter nor a reject counter.

The tabular format selected in FIG. 2 to represent the stock counters 52 to 58 and reject counter 62 to 68 for the stock control system 50 is selected solely to provide an example of an understandable, compact representation and does not necessarily mean storage of the values of the stock counters 52 to 58 and reject counter 62 to 68 in the controller 20 has to be carried out in table form. The values for the stock counters 52 to 58 and for the reject counters 62 to 68 are preferably stored in a memory element of the controller 20. In addition or as an alternative, the values can be stored in memory elements of the respective currency boxes 22 to 28.

In addition, program data for at least one program to control the device 10 and the currency boxes 22 to 28 and the reject box 30 are stored in the controller 20. Preferably, a deposit application, a dispensing application and a reject application are stored, wherein the deposit application is run when currency notes are deposited, and when the deposit application is run, the stock counters for the respective currency boxes 22 to 28 are correspondingly incremented by the appropriate number of newly accepted currency notes. The dispensing application is specifically run when currency notes are dispensed by the controller 20, wherein, as the dispensing application is run, the stock counters 52 to 58 for the currency boxes 22 to 28 are reduced accordingly by the number of the currency notes removed, as previously described. The reject application is run in the same way if an incorrect withdrawal has occurred at the time of disbursal. When the reject application is run, the reject counters 62 to 68 for the currency boxes 22 to 28 are incremented correspondingly by the number of currency notes removed from the particular currency box 22 to 28 and taken to the reject box 30.

The aforementioned applications are specifically configured as

Extension for Financial Services (XFS). As an alternative, the applications can also be configured as Java Extension for Financial Services (JXFS). XFS and JXFS are the two common programming interfaces that are used for self-service devices. The posting of currency notes at the time of deposit, disbursal and when incorrect withdrawals occur at the time of disbursal described previously, are determined by historical developments in programming and cannot be readily changed by reason of the general use of these two standards.

While posting the currency notes during a regular deposit, disbursal and an incorrect withdrawal at the time currency notes are dispensed is easily possible using the known applications, posting a currency note jam when said notes are deposited is problematic because the known applications are configured solely in such a way that incorrect withdrawals are posted at the time currency notes are disbursed. The software is not designed for the possibility that currency note jams can occur at the time of deposit.

With known devices 10 therefore, the currency notes in a currency note jam at the time of deposit were taken to one of the currency boxes 22 to 28 and this currency box 22 to 28 was then taken out of operation, i.e. it was no longer used for disbursal of currency notes. Thus, the functionality of the device 10 was significantly restricted. To prevent this problem, the currency notes from the jam at the time currency notes are deposited are posted in accordance with the method shown in FIG. 3. Stock monitoring system 50 is shown in each case in FIGS. 4 to 6, where stock monitoring is depicted in FIG. 4 before the currency note jam occurs at the time of deposit, in FIG. 5 after one part of the method from FIG. 3 has been run, and in FIG. 6 after running the complete method from FIG. 3.

As can be seen from FIG. 4, before a currency note jam arises, 5-euro currency notes are contained in currency box 22 K, 10-euro currency notes in currency box 24 L, 20-euro currency notes in currency box 26 M, and currency notes in currency box 28 N. The reject counters 62 to 68 for all four currency boxes 22 to 28 have the value 0, meaning that no currency note has been taken from any of the currency boxes 22 to 28 to the reject box 30 at this time.

The method is started in step S10. Then, in step S12, the occurrence of a currency note jam inside the transport path 32 is detected with the aid of at least one sensor 36, where this currency note jam in the selected embodiment consists of a 20-euro currency note.

After the currency note jam has been detected, this 20-euro note causing the currency note jam is transported physically in step S14 by way of the transport unit into the reject box 30. In the subsequent step S16, the stock counter 56 for currency box 26, in which the 20-euro currency note should have been accepted in the regular way since this currency box 26 is intended for the storage of 20-euro currency notes, is increased by the value 1, that is, the number of currency notes involved in the currency note jam that normally would be taken to this currency box 26 in the regular way. As can be seen from FIG. 5, the stock counter for currency box 26 now has the value M+1. The 20-euro currency note causing the jam at the time of deposit is thus posted in the stock monitoring system 50 as if it had been transported according to plan into currency box 26, meaning as if no currency note jam had occurred at the time of deposit. The deposit application specifically is run for this purpose.

Then, in step S18 a virtual disbursal is transacted, where in this virtual disbursal those currency notes that were transported to the reject box 30 by reason of the currency note jam at the time of deposit, are disbursed virtually. Physically, these currency notes remain in the reject box 30. In the embodiment, the virtual disbursal thus consists of a 20-euro currency note. In step 20, the value of the stock counter 56 for currency box 26 is reduced by the value 1 since, according to the virtual disbursal, a currency note was removed from this currency box 26. The disbursal is run specifically by the dispensing application stored in the controller 20.

In addition, the occurrence of a virtual currency note jam is simulated in this virtual disbursal so that in step S20 the reject counter 66 for currency box 26 is incremented by the value 1. The reject application specifically is run in this process. Then the method is concluded in S22.

FIG. 6 represents a stock monitoring system 50 after the entire method from FIG. 3 has been run. As can be seen from FIG. 6, the stock counter 56 for currency box 26 has the value M and the reject counter 66 has the value M+1. Thus, after running the method from FIG. 3, the stock monitoring system 50 reproduces the actual physical status in which the stock counter for 20-euro currency notes for currency box 26 still has the value M, exactly as before the deposit when the currency note jam occurred, whereas the reject counter 66 for currency box 26 has the value 1 since the deposited 20-euro currency note has been transported into the reject box 30.

The effect of the method described previously is that the currency notes from the currency note jam at the time of deposit can be physically taken directly to the reject box 30, i.e. without previously having been taken to one of the currency boxes 22 to 28; said notes, however, are posted in the stock monitoring system 50 in terms of data processing as an error-free regular deposit and a subsequent disbursal with the occurrence of a currency note jam. Thus, it is easily possible, even with the occurrence of currency note jams at the time of deposit to accept the currency notes causing the jam in the reject box 30 and nonetheless to post the actual stock easily using the existing application structure. So the actual stock of the device 10 of currency notes can be determined at any time without mistakes.

Furthermore, it is not necessary to modify the market standards XFS or JXFS. These market standards are expected by other proprietary applications so that changing these market standards would be problematic.

The further effect is that the device 10 can remain in operation, i.e. all currency boxes 22 to 28 can still be used.

What is claimed:

1. A device for handling currency notes, comprising:
   wherein the device has a deposit and dispensing unit for the deposit and disbursal of currency notes, a controller, at least one currency box for storing currency notes, a reject box for receiving currency notes to be retained, and a transport unit for transporting the currency checks between the deposit and dispensing unit, the currency box and the reject box,
   wherein a stock counter indicating the current stock of currency notes in the currency box is provided;
   wherein when a currency note is removed from the currency box, the controller reduces the value of the stock counter by the value of one, and when a currency note is brought to the currency box said controller increments the value of the stock counter by the value of one;
   wherein when an incorrect withdrawal occurs after removing at least one currency note from the currency box, the controller activates the transport unit in such a manner that said transport unit transports the currency note, or currency notes, in the incorrect withdrawal into the reject box, and wherein a reject counter is provided, clearly assigned and specific to the currency box, that indicates the total number of currency notes removed from this currency box and taken to the reject box, and wherein the controller increments the value of this reject counter by the number of currency notes transported to the reject box by reason of the incorrect withdrawal, wherein, when a currency note jam occurs during transportation of at least one deposited currency note from the deposit and dispensing unit towards the currency box, the controller initially increments the stock counter of the currency box by the number of currency notes in the currency note jam in a first step, and in that the controller then, in a second step, reduces the value of the stock counter of the currency box by the number of currency notes from the jam and increments the value of the reject counter for the currency box by the number of currency notes in the currency note jam.

2. The device from claim 1, wherein the current value of the stock counter and/or the current value of the reject counter of the currency box are stored in a memory element of the currency box.

3. The device from claim 1, wherein the current value of the stock counter and/or the current value of the reject counter of the currency box are stored in a memory element of the controller.

4. The device from claim 1, wherein the controller activates the transport unit in such a manner that said transport unit transports the currency notes from the currency note jam directly to the reject box.

5. The device claim 1, wherein several currency boxes are contained in the device, and wherein the current value of a stock counter and the current value of a reject counter for each currency box are stored.

6. The device from claim 5, wherein, following the deposit of a bundle of several currency notes by way of the deposit and dispensing unit, the controller establishes which of the currency notes is to be accepted into which of the currency boxes and thereby clearly assigns a currency box to each currency note, wherein the controller activates the transport unit in such a manner that the latter transports each currency note to the respectively assigned currency box, wherein, when a currency note jam occurs during this transportation process, the controller initially adds the currency notes involved in the currency note jam to the value of the individual stock counter of the currency box assigned to the individual currency note, and wherein the controller subsequently again reduces the value of the stock counters that were incremented by reason of the currency note jam by the value by which said counters were incremented, and increases the value of the individual reject counter of the respective currency boxes by this value.

7. The device from claim 1, wherein the device includes at least one sensor to determine the denomination of the currency notes deposited and/or to check the authenticity of the currency notes deposited.

8. The device from claim 5, wherein the currency notes in the currency boxes are stored separately by denomination.

9. The device from claim 1, wherein the controller adds up the values of the stock counters of all the currency boxes in the device to determine the stock of currency notes for the device, and adds up the values of the reject counters for all the currency boxes in the device.

10. The device from claim 1, wherein program data for at least one application, preferably for several applications, are stored in the controller to operate the device, and wherein at least one, preferably several, of the applications is configured as an Extension for Financial Services (XFS) application or a Java Extension for Financial Services (JFXS) application.

11. The device from claim 10, wherein a deposit application that the controller runs at the time currency notes are deposited, a dispensing application that the controller runs when currency notes are disbursed, and/or a reject application that the controller runs when an incorrect withdrawal occurs, are stored in the controller.

12. The device from claim 11, wherein the controller runs the deposit application in the first step and the dispensing application and the reject application in the second step when a currency note jam occurs at the time of deposit.

13. The device from claim 1, wherein the controller, when the currency note jam occurs at the time currency notes are deposited, initially posts these currency notes from the jam in such a way as if no currency note jam had occurred, wherein the controller, then posts a virtual disbursal of these currency notes from the jam, and wherein the controller posts the currency notes at this virtual disbursal as if a currency note jam occurred at the virtual disbursal.

14. A method for operating a device for handling currency notes in which currency notes are issued and entered with the aid of an deposit and dispensing unit, comprising:
   wherein at least one currency box is used for holding currency notes, a reject box is used for receiving currency notes to be retained, and a stock counter is used that indicates the current stock of currency notes in the currency cassette,
   wherein when a currency note is removed from the currency box, the value of the stock counter is reduced by the value one,
   wherein when a currency note is brought to the currency box, the value of the stock counter is incremented by the value of one,
   wherein when an incorrect withdrawal occurs following the removal of at least one currency note from the currency box, the currency note, or currency notes, from the incorrect withdrawal are transported to the reject box, and a reject counter clearly assigned and specific to the currency box is used that indicates the total number of currency notes removed from this currency box and taken to the reject box, at which time the value of this reject counter is incremented by the number of currency notes transported to the reject box reason of the incorrect withdrawal, wherein, when a currency note jam occurs during transportation of at least one deposited currency note from the deposit and dispensing unit to the currency box, the value of the stock counter for the currency box is incremented initially in a first step by the number of currency notes from the currency note jam, and in that, in a subsequent second step, the value of the stock counter for the currency box is reduced by the number of currency notes in the currency note jam, and the value of the reject counter is incremented by the number of currency notes in the currency note jam.

* * * * *